Dec. 29, 1970   J. D. EDWARDS   3,550,486
TOOL FOR HOLDING RIVETS AND BOLTS DURING THEIR
FASTENING IN OTHERWISE INACCESSIBLE PLACES
Filed Nov. 15, 1967

INVENTOR
JOHN D. EDWARDS
BY Roy Mattern Jr.
ATTORNEY

United States Patent Office 3,550,486
Patented Dec. 29, 1970

3,550,486
TOOL FOR HOLDING RIVETS AND BOLTS DURING THEIR FASTENING IN OTHERWISE INACCESSIBLE PLACES
John D. Edwards, 15315 SE. 24th St.,
Bellevue, Wash. 98004
Filed Nov. 15, 1967, Ser. No. 683,213
Int. Cl. B25b 13/06
U.S. Cl. 81—125                                                2 Claims

ABSTRACT OF THE DISCLOSURE

A tool has a variable length handle terminating in a pivotal mounting of an interchangeable receiver which surrounds a holding magnet to receive rivets and bolts for their placement through holes to be fastened in otherwise inaccessible places in structures of all types.

BACKGROUND OF INVENTION

Figures 1, 2:
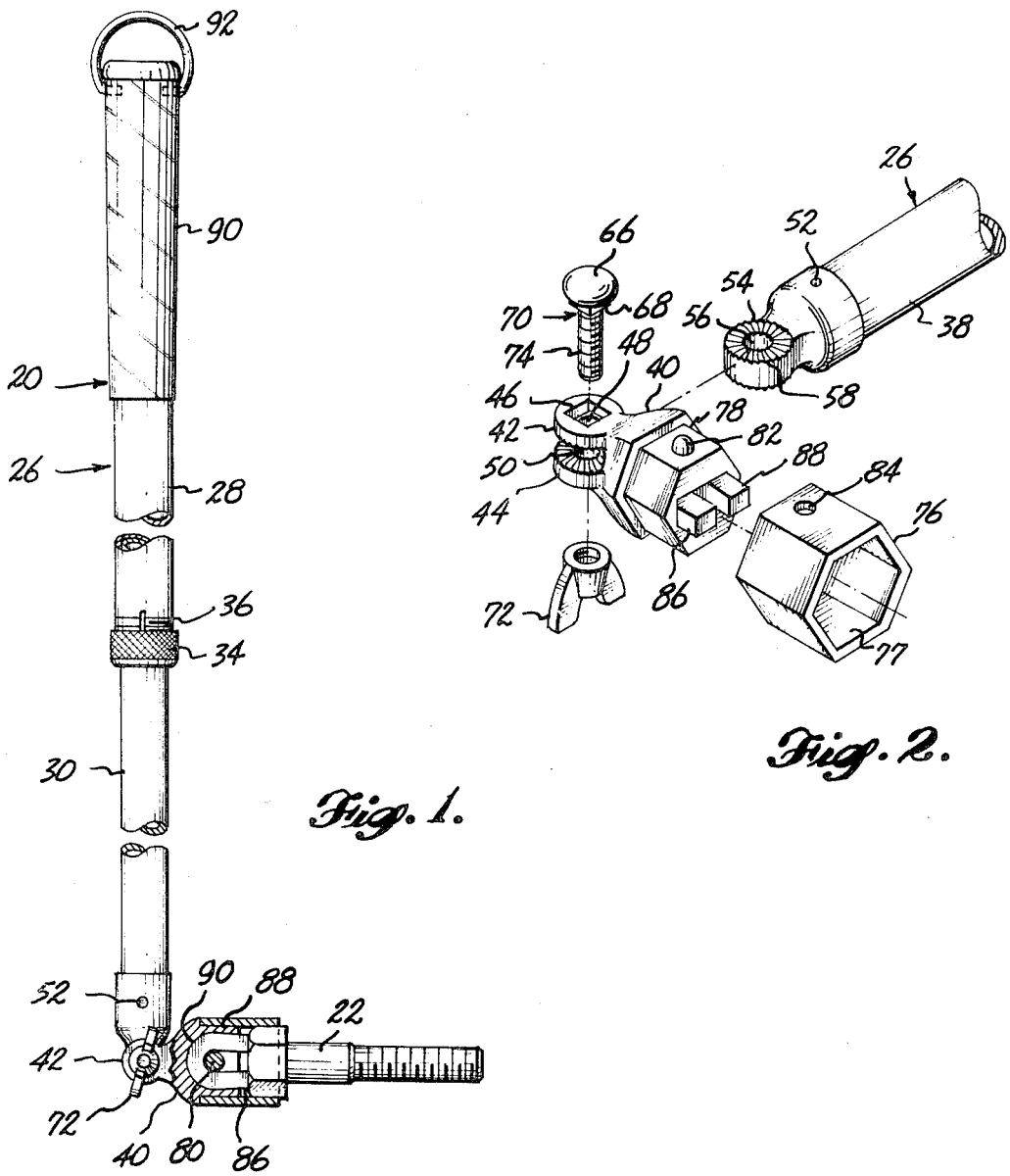

In erecting large steel frame structures such as bridges and office buildings there are many portions which are very inaccessible such as interiors of box like girders and columns when placement of one portion of a fastener assembly must be undertaken. J. D. Dearing in his Pat. 3,232,148 provides a tool for holding nut fasteners in place during their installation in otherwise inaccessible places. This invention is directed to this objective and others and is concerned with improvements found to be necessary in securing fasteners in heavier and larger structures such as highway bridges and high office buildings.

SUMMARY OF INVENTION

A tool is provided for difficult placement of fasteners in otherwise inaccessible places within structural sections of bridges, buildings, ships, etc. The tool is interchangeably equipped with variable sized receivers or sockets secured to a pivotally mounted head. The head includes a holding magnet to hold respective fasteners in place within a selected size receiver. An extendable handle places the head at a selected distance from a handle grip. Also the head is secured about its pivotal axis at a selected angle with the handle axis. When the tool is preset, a fastener, such as a bolt or rivet, is held head first within the receiver against the magnet and then moved through an otherwise inaccessible hole and held in place until secured, such as a nut being threaded on a bolt or a rivet being headed.

DRAWINGS

A preferred embodiment of the invention is illustrated in the accompanying drawings, wherein:

FIG. 1 is a side view of the assembled tool with some portions removed to indicate positioning of a fastener component and the extendable handle; and FIG. 2 is an enlarged exploded view of the joining of handle, pivotal head, magnet and interchangeable receiver.

PREFERRED EMBODIMENT

In FIGS. 1 and 2, a preferred embodiment is illustrated which is very effectively used during bridge construction. In such structures there are many places, such as on chords, where large machine bolt and nut fasteners and also rivets are installed with difficulty using tongs and other devices to hold fastener components in place beyond the reach of a man's arm and hand. Moreover, the only access to the inside of such bridge chord or like structural interior is through a limited sized access hole which is often several feet removed from the hole through which a fastener component must be inserted. Tongs, which are now principally used, are hard to control and fasteners are generally only held at awkward angles such as during their insertion into holes of a top cover plate. As a result many fasteners are installed with difficulty and in making installation attempts many fasteners are dropped and lost in inaccessible places such as river beds below the structure.

Therefore, as shown in FIG. 1, a positioning tool 20 is used to accomplish his installation of a fastener component 22 in such remote and often otherwise inaccessible places on and within structures. Variable distances between access and fastening places are matched by selectively lengthening a handle and/or rod 26 having at least two telescoping sections 28 and 30 which are locked at a selected overall length by turning locking threaded sleeve 34 over a serrated threaded portion 36 on rod section 28 causing a friction grip of rod section 28 about rod section 30.

Variable angles between an axis of handle or rod 26, and an axis of a hole in a structural part being erected (not shown) which accommodates a fastener 22 are matched by selectively pivoting a head 40 relative to handle 26 and tightening head 40 into place. Such tightening of head 40 occurs by using a structural combination of:

Spaced bearing structures 42, 44 on head 40, structure 42 having an initial square recess 46 commencing its central hole 48 and terminating in serrations (not shown) and structure 44 having central hole 50;

A single bearing end structure 54 secured by pin 52 on rod 20 having a central hole 56 and lower serrations 58 for placement between spaced bearing structures 42, 44 on head 40; and A combined fastener and pivotal axis pin derived from a round top 66, square bottom 68, threaded bolt 70 passed through bearing structures 42, 44 and 54 and secured by tightening a wing nut 72 on threads 74 of bolt 70.

Variable sizes of fasteners 22 or rivets (not shown) are matched by interchanging various sized receivers or sockets 76 having various sized commencing interiors 77. These sockets 76 are snapped on and off pivotal head 40 using near conventional socket wrench structural arrangement of mounting shoulders 78, one of which is equipped with a pin retainer 80 having a spherical end 82 partially projected under spring force (spring not shown) to slip into recess 84 on a receiver or socket 76.

All sizes of fasteners, once inserted into a selected comparable sized receiver or socket 76 mounted on head 40, remain inserted because each receiver 76 has portions which surround magnet extensions 86, 88 of opposite polarity having sufficient magnetic force holding power to firmly position any fastener component, bolt 22 or rivet, etc. within receiver 76 during installation of a fastener assembly. Such extensions 86, 88 from part of a horseshoe shaped magnet 90 which is retained by pin 80 having spherical end 82 as previously noted, thereby serving a dual fastening purpose.

Tool 20 is provided with a hand and finger gripping wrapping 90 and also a retaining loop 92 to receive an end of a rope (not shown). Although hand gripping is generally sufficient there are times during bad weather, or when a tool 20 is lifted or lowered to a user that a rope will be tied to loop 92.

In using tool 20: rod 26 will be adjusted in length; head 40 will be set at an angle; fastener component 22 will be inserted in head 40; tool 20 will be moved into position; fastener component 22 will be guided through a structural hole; completion of fastening will be undertaken; and tool 20 will be removed. All these steps will be quickly and conveniently undertaken and no loss of fastener components 22 or tool 20 will occur when reasonable care is taken.

I claim:

1. A tool comprising an adjustable handle having first and second handle sections telescopically connected together for relative extensible movement therebetween, means for securing said handle sections together at a selected adjusted length of said handle, the projecting end of one said handle sections having a first pivot pin receiver connected thereto, a magnet holder having at one end a second pivot pin receiver, said first and second pivot pin receivers including cooperating interfitting means establishing a plurality of relative angular positions obtainable between said holder and said one handle section, pivot pin means pivotally connecting said pivot pin receivers together and locking said receivers in a selected one of said angular positions, the other end of said holder having multiple external panar side surfaces, permanent magnet means stationarily supported in said other end of said holder wholly within the lateral confines of the planes of said external surfaces and having end poles projecting longitudinally from said other end of said holder, a removable tubular fastener receiver having a first portion formed with multiple interior planar surfaces which mate with said multiple external planar surfaces on said holder and a second portion extending beyond said other end of said holder and the end poles of said magnet means and suitably sized to receive a given size fastener, and retainer means for securing said magnet means on said holder and also for releasably securing said fastener receiver to said holder during use of said tool.

2. A tool as defined in claim 1, wherein the projecting end of the other of said handle sections has hook means connected thereto.

References Cited

UNITED STATES PATENTS

| | | | |
|---|---|---|---|
| 875,967 | 1/1908 | Tietz | 145—61(61) |
| 952,435 | 3/1910 | Miller | 81—177.8 |
| 1,268,734 | 6/1918 | Lay | 81—177.8UX |
| 1,380,643 | 6/1921 | Eagle | 81—177.9 |
| 2,102,926 | 12/1937 | Tipsord | 81—13 |
| 3,145,595 | 8/1964 | Mauck | 81—125 |

THERON E. CONDON, Primary Examiner

R. V. PARKER, JR., Assistant Examiner

U.S. Cl. X.R.

81—177.8